Patented Sept. 11, 1934

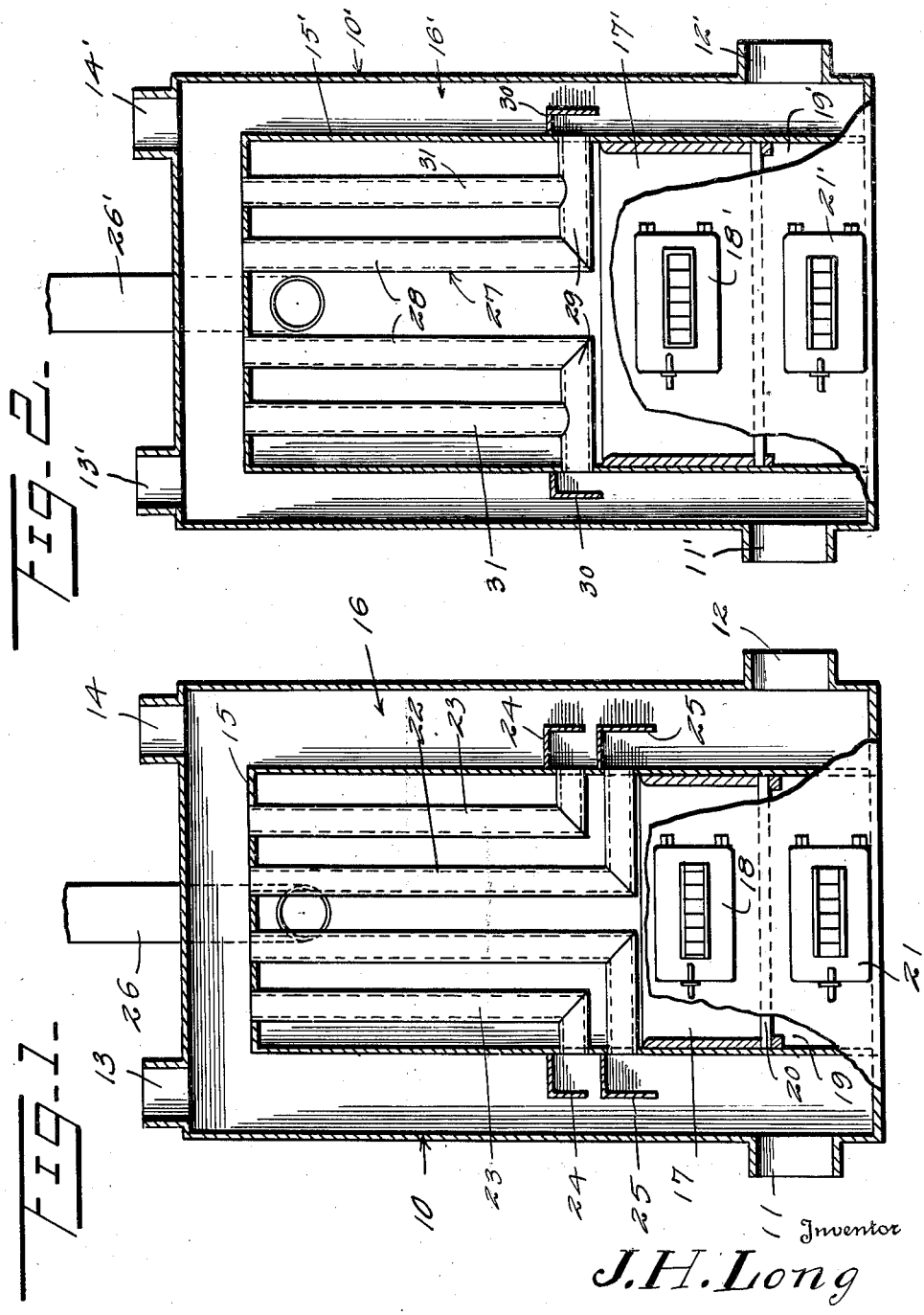

1,973,642

UNITED STATES PATENT OFFICE 1,973,642

HEATER

Joseph H. Long, Cleveland, Ohio

Application May 3, 1932, Serial No. 608,954

1 Claim. (Cl. 126—109)

This invention relates to heaters and more particularly to an air heater and is an improvement over my copending applications, Serial No. 574,196, filed November 10, 1931, and Serial No. 596,991, filed March 5, 1932.

An object of this invention is to provide a heater which may be disposed at any convenient point whereby the air may be passed through the heater and into the desired portion of the building to be heated, the cool air entering the heater at the bottom and passing upwardly therethrough.

Another object of this invention is to provide a tubular heater wherein any desired kind of fuel may be used for heating of the air within the device.

A further object of this invention is to provide in a heater of this kind means whereby the air may pass substantially about the outer surface of the combustion chamber and a portion of the air be deflected through tubular members extending through the combustion chamber and heated therein.

The above and various other objects and advantages of this invention will in part be described in and in part be understood from the following detailed description of the present preferred embodiment, the same being illustrated in the accompanying drawing, wherein:—

Figure 1 is a vertical section partly in detail of a device constructed according to the preferred embodiment of this invention.

Figure 2 is a similar view of a modified form of this heater.

Referring to the drawing wherein like numerals of reference designate corresponding parts throughout the several views, the numeral 10 designates generally an outer jacket or casing of desired size and configuration which is provided at opposite sides with air inlets 11 and 12, respectively, and at the upper portion or top thereof with a pair of outlets 13 and 14.

Disposed within the outer casing 10 is an inner casing or combustion chamber 15 which is of a height less than the height of the outer casing so as to provide a space between the top of the inner casing or combustion chamber, and the outer casing, and the width of the combustion chamber is less than the width of the outer casing so as to provide a heating chamber 16 about the outer surface of the combustion chamber which communicates with the intake ports 11 and 12 and with the outlet ports 13 and 14.

A fire box 17 having a door 18 is disposed at the bottom of the combustion chamber 15 and an ash pit 19 is disposed below the grate 20 within the fire box 17 and entrance to this ash pit is had through a hinged door 21. However, the heating means in the form of a fire box 17 is merely diagrammatic as other heating means may be used for heating of air within the combustion chamber 15.

A plurality of L-shaped heating tubes 22 and 23 are mounted within the combustion chamber 15 being positioned with one leg vertical and the other horizontal and disposed one above the other. Any desired number of these heater tubes 22 and 23 may be positioned within the interior of the combustion chamber 15, and the horizontal leg of these tubes 22 and 23 is disposed closely adjacent the fire box 17 and communicates with the heating chamber 16 slightly above the intake ports 11 and 12.

In the present instance, the heater tube 23 is positioned above the heater tube 22 and an upper L-shaped baffle 24 is secured to the outer wall of the combustion chamber 15 in a position where one leg is horizontal and the other vertical and offset outwardly from the connection between the horizontal leg of the heater tube 23 and the side wall of the combustion chamber 15.

A lower L-shaped baffle 25 is disposed in a position to deflect the incoming air to the horizontal leg of the lower heater tube 22, and this baffle 25 is disposed in downwardly spaced relation to the upper baffle 24. Preferably, the vertical leg of each baffle is positioned inwardly from the side wall of the outer casing 10 so that the air may freely pass between the outer surface of the baffles 24 and 25 and the confronting face of the wall of the casing 10. In this manner, the incoming or cool air will be partially deflected through the heater tubes 22 and 23 and the remaining or undeflected air will pass about the combustion chamber 15 and upwardly through the outlet ports 13 and 14. A smoke pipe 26 is connected at one end to the combustion chamber 15 adjacent the upper end thereof so as to draw off the smoke or gases within this chamber.

As shown in Figure 2, the outer casing 10' of the heater is similar to the outer casing 10, being provided with intake ports 11' and 12' and outlet ports 13' and 14'. The combustion chamber 15' is similar to the combustion chamber 15 and a smoke pipe 26' is connected to this combustion chamber to draw off the heated gases passing upwardly in this combustion chamber 15' from the fire box 17'. A feed door 18' permits the passage of fuel into the fire box 17' and a door 21' permits the removal of ashes from the ash pit 19'.

A plurality of heater tubes of substantially L-shaped construction are disposed within the combustion chamber 15' and these heated tubes which are generally designated 27 have the vertical leg 28 thereof connected to the top of the combustion chamber 15', and the horizontal leg 29 is connected at the side wall of the combustion chamber 15'.

An L-shaped deflector 30 is carried by the side wall of the combustion chamber 15' so as to deflect the air from the air chamber 16' into the horizontal leg 29 of the heater tube 17. This horizontal leg 29 constitutes a heating manifold and a pipe 31 is connected to this manifold or horizontal member 29 and is also connected to the top of the combustion chamber so as to permit the air to pass upwardly therethrough and out into the heating chamber 16' at the top of the combustion chamber 15'.

While I have disclosed a manifold with only one pipe 31 connected thereto, I, of course, do not wish to be limited to this particular construction, as any desired number of vertical take-offs may be provided so as to thoroughly heat the air deflected thereinto by the deflector 30.

In the use and operation of this heater, the desired fuel may be placed in the fire box 17 and the intake ports 11 and 12 connected to the desired source of fresh air supply which may be taken either from the room in which the heater is positioned or taken from a conduit connected to the atmosphere outside of the building. The outlet ports or nipples 13 and 14 may be connected to suitable conduits extending throughout the building so as to heat the air within the building.

It will be readily apparent that the combustion chamber 15 or 15' may have any desired heating unit or means disposed within the lower portion thereof, such as an oil burner or a gas burner without departing from the spirit of this invention.

It is, of course, understood that various changes and modifications may be made in the details of construction and design of the above specifically described embodiment of this invention without departing from the spirit thereof, such changes and modifications being restricted only by the scope of the following claim.

What is claimed is:—

A heater as set forth, comprising an outer casing, a combustion chamber within the outer casing having a size to provide an air heating chamber between the sides and top of the outer casing and combustion chamber, a plurality of L-shaped heater tubes disposed within the combustion chamber and having one leg horizontal and the other leg vertical, said horizontal legs communicating with the heating chamber through the side walls of the combustion chamber and the vertical legs communicating with the heating chamber through the top of the combustion chamber, the horizontal legs of heater tubes connected to one side wall of the combustion chamber being disposed in opposed relation to the heater tubes connected to the other side of the combustion, a heating means in the combustion chamber below said heater tubes in a position whereby the heat from the heating means will initially contact with the horizontal legs of the heater tubes, L-shaped baffles carried by the side walls of the combustion chamber to deflect a portion of the air in the air heating chamber into said tubes, inlet connections carried by the outer casing adjacent the bottom thereof directly below said baffles; and outlet connections carried by the outer casing at the top thereof.

JOSEPH H. LONG.